United States Patent [19]

Nakahara et al.

[11] Patent Number: 4,874,934

[45] Date of Patent: Oct. 17, 1989

[54] IC CARD WHICH DISPLAYS EMBOSSED INFORMATION TO PREVENT COUNTERFEITING

[75] Inventors: Jirou Nakahara, Fujisawa; Akito Ueshin, Yokohama; Shiro Okajima, Tokyo, all of Japan

[73] Assignee: Kabushiki Kaisha Toshiba, Kawasaki, Japan

[21] Appl. No.: 66,021

[22] Filed: Jun. 24, 1987

[30] Foreign Application Priority Data

Jun. 28, 1986 [JP] Japan .................................. 61-152160

[51] Int. Cl.⁴ ............................................. G06K 19/06
[52] U.S. Cl. .................................... 235/492; 235/379; 235/380; 235/448; 235/487
[58] Field of Search ............... 235/448, 379, 380, 492, 235/487

[56] References Cited

U.S. PATENT DOCUMENTS

| | | |
|---|---|---|
| 4,394,654 | 7/1983 | Hoffman-Cerfontaine ........ 235/380 |
| 4,628,195 | 12/1986 | Baus ..................................... 235/448 |
| 4,636,947 | 1/1987 | Ward .................................... 235/379 |
| 4,689,478 | 8/1987 | Hale ..................................... 235/379 |
| 4,733,060 | 3/1988 | Ono ...................................... 235/448 |

Primary Examiner—Harold I. Pitts
Attorney, Agent, or Firm—Cushman, Darby & Cushman

[57] ABSTRACT

The portable memory medium of the invention has a memory, for storing the predetermined information which is embossed on its surface, and a CPU. When a read instruction is supplied from a portable memory medium handling system externally connected to the portable memory medium, the CPU reads out the predetermined information stored in the memory, and supplies it to the portable memory medium handling system, which then displays the information on a display unit. The operator compares the information displayed on the display unit with the predetermined information embossed on the portable memory medium, and thereby determines the authenticity of the embossed predetermined information.

13 Claims, 6 Drawing Sheets

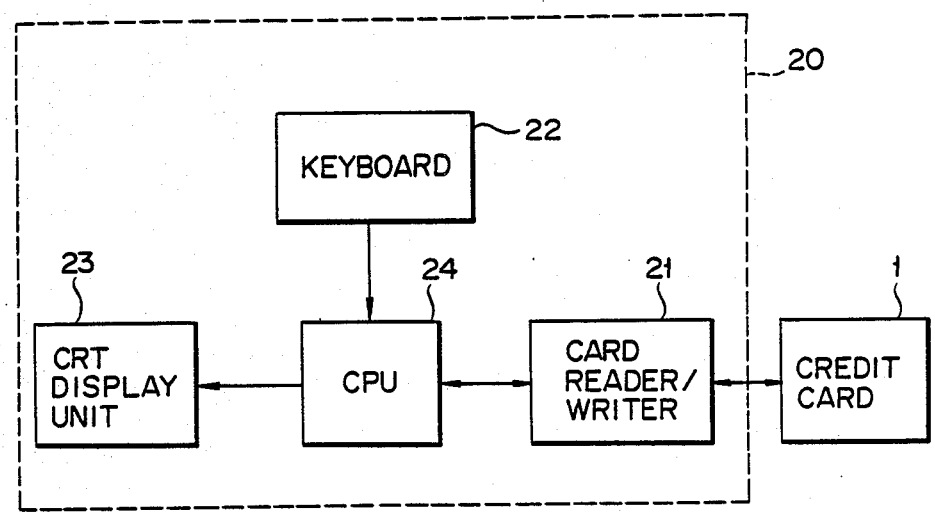
F I G. 3
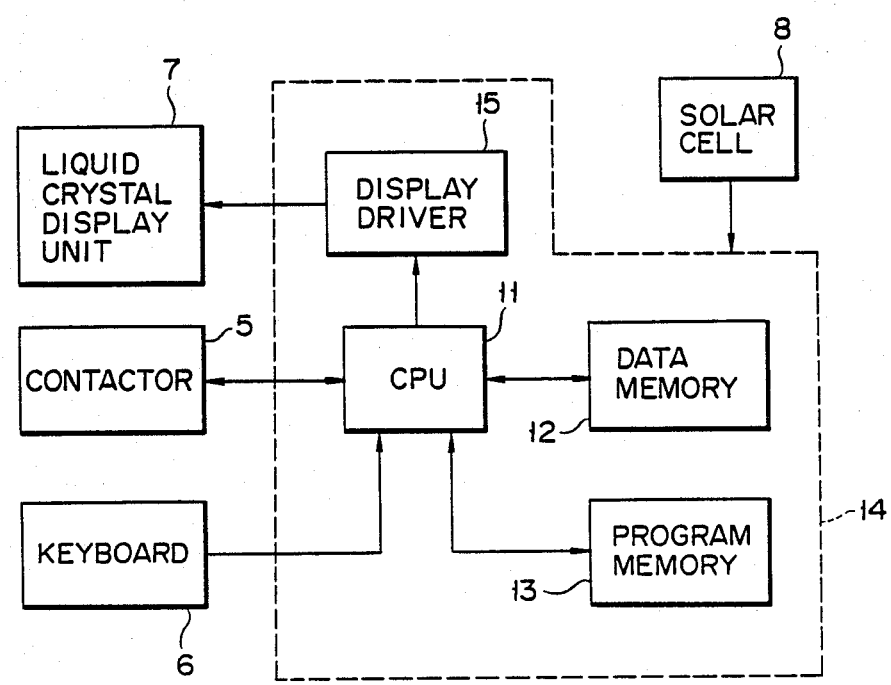
F I G. 5

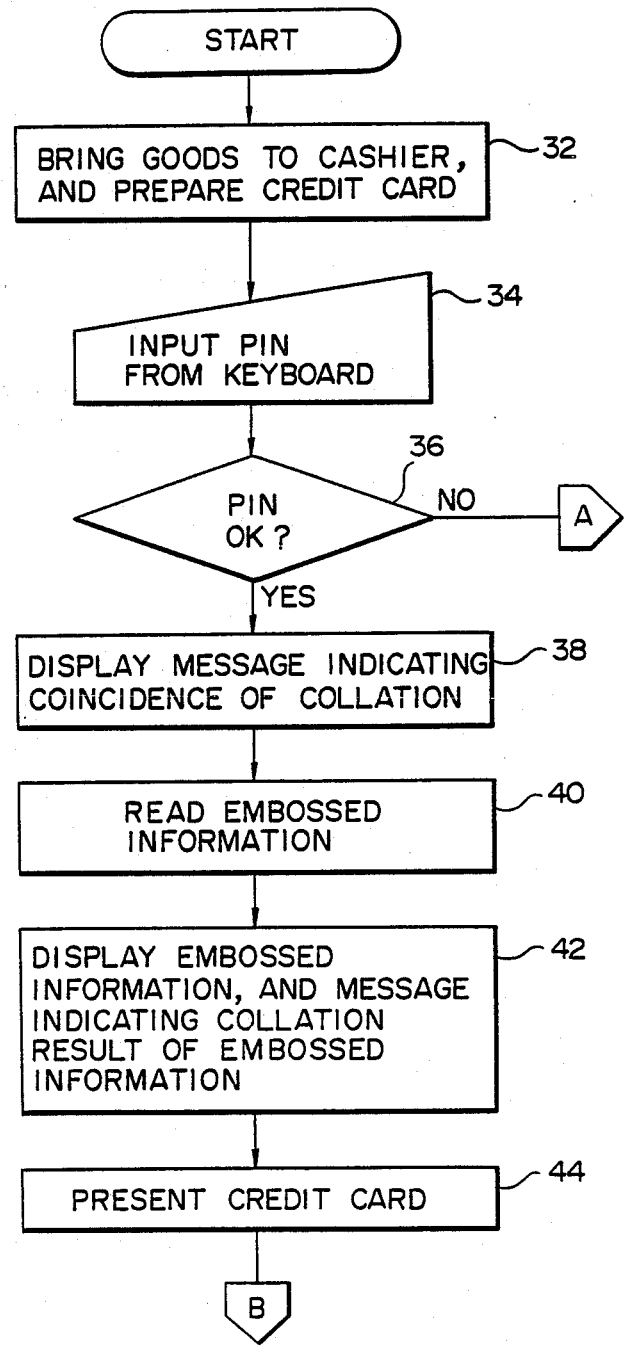
F I G. 6A

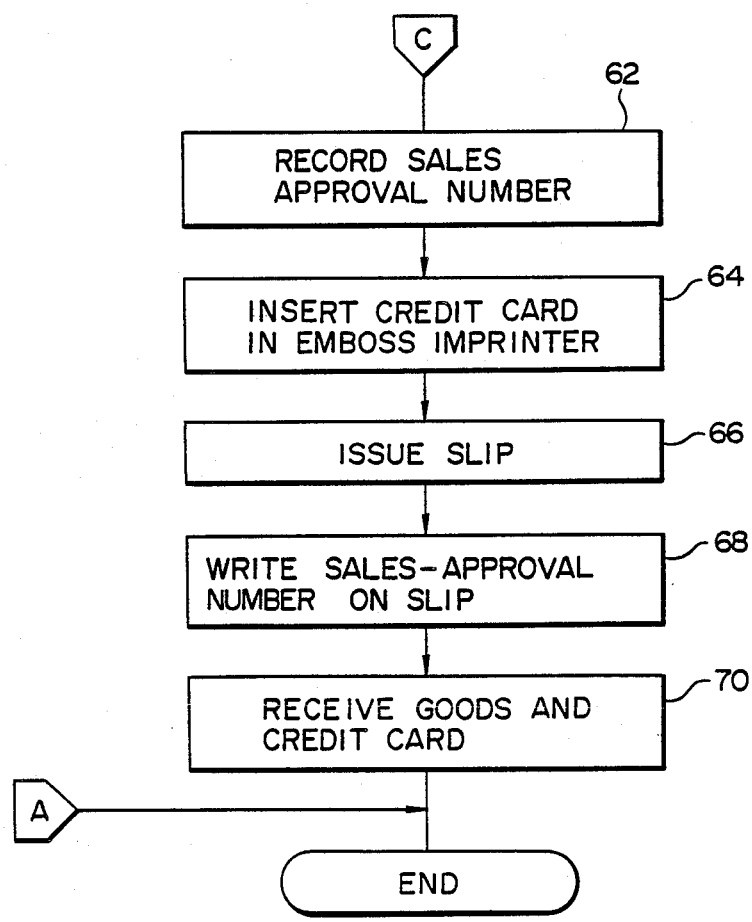
F I G. 6C

4,874,934

IC CARD WHICH DISPLAYS EMBOSSED INFORMATION TO PREVENT COUNTERFEITING

BACKGROUND OF THE INVENTION

The present invention relates to a portable memory medium such as a credit card.

Because of their convenience and security, credit cards are now widely used for settling a wide variety of transactions. Usually, when a transaction is carried out using a credit card, information embossed on the credit card, i.e., customer information, is transferred onto a slip such as a receipt by means of an emboss imprinter at a shop's register, and is kept as a record of the transaction. The purchase amount is subsequently deducted automatically from the customer's bank account.

However, a credit card can be easily counterfeited, since it has a relatively simple structure. It is therefore possible to obtain someone else's customer information, to make a counterfeit credit card by embossing the information on a card, and to use the card illegally. As a result, the amount of purchase is withdrawn from a bank account designated by the information embossed on the counterfeit credit card.

SUMMARY OF THE INVENTION

It is an object of the present invention to provide a portable memory medium which can be protected against being illegally used by counterfeiting of the customer information embossed thereon.

In order to achieve the above object, a portable memory medium of the present invention, which has predetermined information embossed on its surface, comprises display means, storage means for storing the predetermined information, means for producing a signal indicating a read operation of the predetermined information stored in the storage means, and control means for reading out the predetermined information, in response to the signal indicating the read operation, and for displaying the readout predetermined information on the display means.

The portable memory medium of the present invention has a memory for storing information embossed on the card surface, and output means for outputting the customer information stored in the memory, in response to an input instruction. As a result, the authenticity of the customer information can be determined by comparing the information embossed on the card surface with the information stored in the memory.

BRIEF DESCRIPTION OF THE DRAWINGS

Other objects and features of the present invention will be apparent from the following description taken in connection with the accompanying drawings in which:

FIG. 3 is a block diagram showing the arrangement of a card handling system for the credit card shown in FIG. 1;

FIG. 5 is a block diagram showing the circuit configuration of the credit card shown in FIGS. 4A and 4B; and FIGS. 6A through 6C are flow charts for explaining the operation when the credit card and the card handling system shown in FIGS. 1 and 3, respectively, are used.

DETAILED DESCRIPTION OF THE PREFERRED EMBODIMENTS

Figure 1:
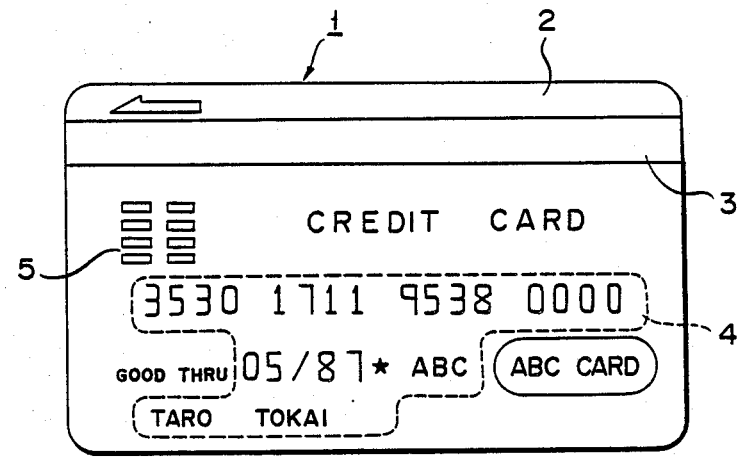
FIG. 1 shows the outer appearance of a credit card according to an embodiment of a portable memory medium of the present invention.

FIG. 1 shows the outer appearance of credit card 1 according to a first embodiment of the portable memory medium of the present invention. Card main body 2 is made of, e.g., a thin rectangular plastic plate. Belt-like magnetic stripe 3 is formed on one edge surface of main body 2 to extend in the longitudinal direction of card 1. Information about the owner of card 1 and so on is magnetically stored in stripe 3. Identification information 4 about the card owner, e.g., code and name of the card owner and the valid date of card 1, is embossed on the surface of main body 2. Contactor 5 is also provided on the surface of main body 2. Contactor 5 is electrically connected with an integrated circuit (IC) buried in main body 2 and serves as an input/output terminal to obtain electrical contact with a card reader/writer (not shown).

Figure 2:
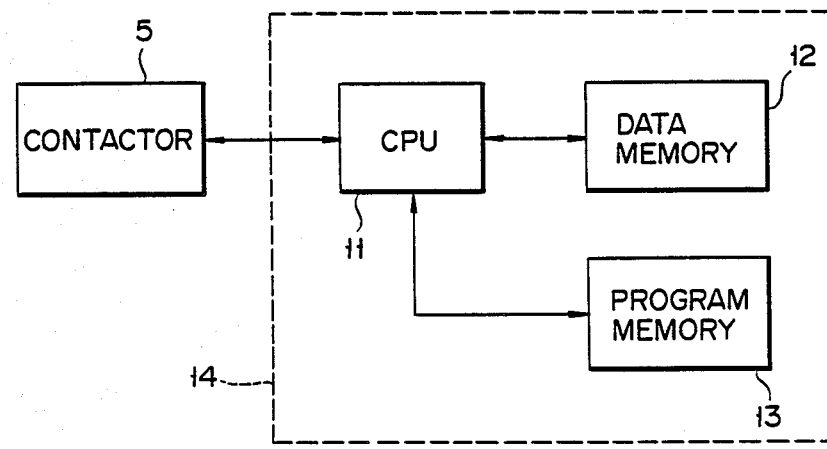
FIG. 2 is a block diagram schematically showing the circuit configuration of the credit card shown in FIG. 1.

FIG. 2 shows the schematic arrangement of credit card 1 shown in FIG. 1. More specifically, the circuitry of credit card 1 consists of contactor 5, central processing unit (CPU) 11 connected to contactor 5, and data and program memories 12 and 13 connected to CPU 11. CPU 11 and data and program memories 12 and 13 are constituted by a single chip 14. A chip such as an 8-bit microprocessor HD65901 available from Hitachi Ltd. can be used. The chip is buried in card main body 2. Data memory 12 comprises, e.g., an electrically erasable programmable read only memory (EEPROM). Memory 12 stores embossed information 4 and transaction data processed by CPU 11. Program memory 13 comprises, e.g., a mask ROM and stores the control program of CPU 11.

FIG. 3 is a block diagram showing the arrangement of a card handling system for credit card 1 shown in FIG. 1. Card handling system 20 consists of card reader/writer 21 having an emboss imprint function, keyboard 22, CRT display unit 23, and CPU 24 for controlling these components.

Figure 6B:
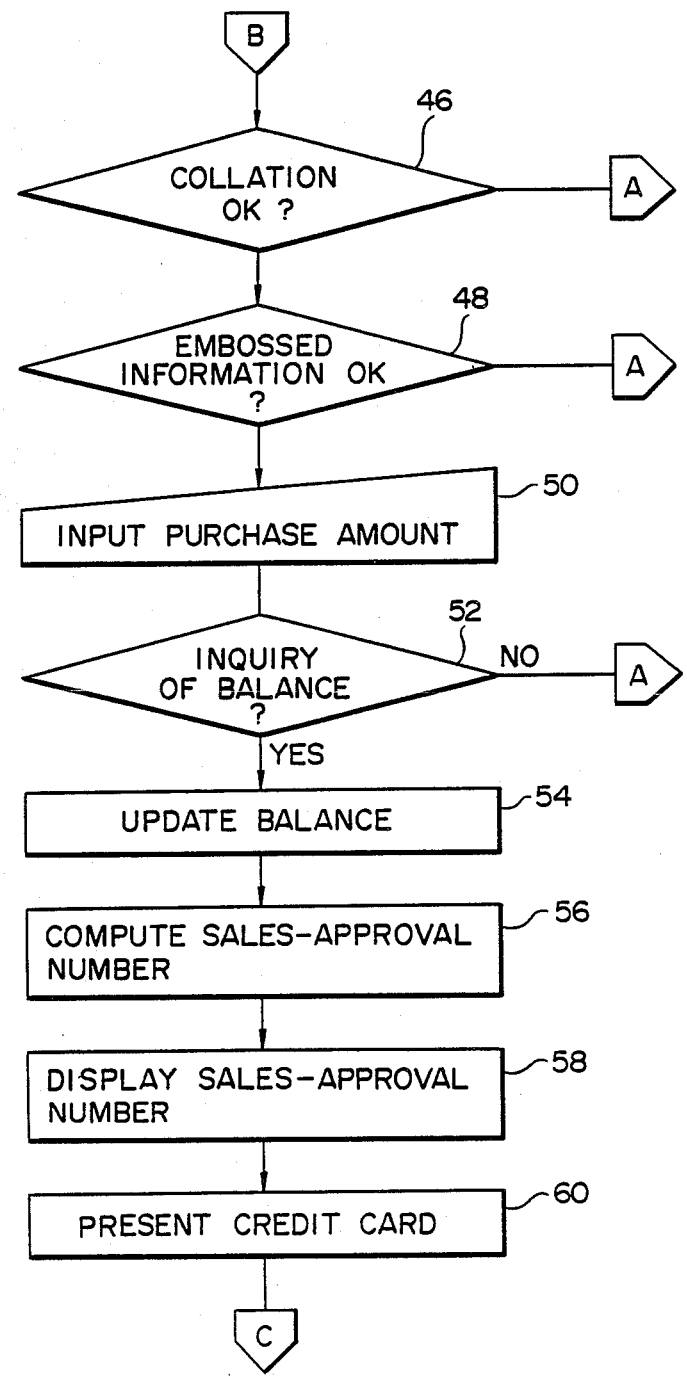

The operation when credit card 1 of the above embodiment and card handling system 20 are used will be described with reference to the flow charts of FIGS. 6A through 6C. FIGS. 6A through 6C schematically show the sequence 3 for using card 1 at a shop to purchase articles and, more specifically, show the operation sequence performed by the card owner, the operation sequence performed by the operator at the shop, and the operation content of card handling system 20. Assume that the card owner purchases articles at a shop and uses credit card 1 in place of paying in cash. The card owner takes the articles to the register, and submits his card 1 to the operator together with the articles (step 32). The operator inserts the received card 1 in card reader/writer 21 of card handling system 20 (step 34), and inputs an instruction signal through keyboard 22 to output embossed information (step 36). The input instruction signal is supplied from CPU 24 to CPU 11 in card 1 via reader/writer 21 (step 38). CPU 11 reads out the embossed information from data memory 12 (step 40), and sends the readout embossed information to CPU 24 via reader/writer 21 (step 42). CPU 24 displays the embossed information sent from card 1 on CRT display unit 23 (step 44) and discharges card 1 from reader/writer 21 (step 46). In this case, the operator collates the content of the embossed information displayed on display unit 23 with the content of the embossed information on card 1 (step 48) to determine whether they coincide. If YES in step 48, the operator identifies the card user as the legal card owner, reinserts card 1 in reader/writer 21 (step 50), and inputs a slip issue instruction from keyboard 22. As a result, CPU 24 actuates the emboss imprint function of reader/writer 21, and issues a slip to which embossed information on card 1 is transferred (step 52). The card owner receivese the articles and card 1 (step 54), and finishes shopping. However, if NO in step 48, the card user cannot purchase any article using card 1.

In this manner, embossed information 4 on credit card 1 is stored in data memory 12 of card 1. When card 1 is used, the stored embossed information is read out and displayed. Therefore, authenticity of the embossed information can be determined by checking whether the displayed embossed information coincides with the embossed information on card 1. As a result, illegal use of card 1 can be prevented.

Card handling system 20 can have a PIN collation function in order to prevent embossed information stored in data memory 12 from being easily externally read out or being easily changed. For example, a PIN (collation information) of the card owner is stored in advance in data memory 12. When credit card 1 is used, the PIN of the card owner is input from keyboard 22 in order to send it to CPU 11 from CPU 24. CPU 11 sends the PIN to data memory 12. The sent PIN is collated with the PIN prestored in data memory 12 by CPU 11. The embossed information is read out from data memory 12 when the two PINs coincide.

A second embodiment of the present information will be described with reference to FIGS. 4A and 4B. The same reference numerals denote the same parts as in the first embodiment and a detailed description thereof is omitted. Only parts different from the first embodiment will be described in detail.

Figure 4A:
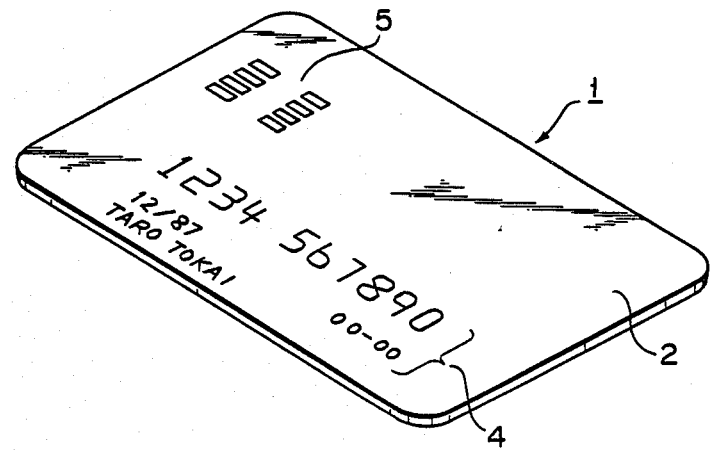
FIGS. 4A and 4B are perspective views showing the outer appearance of a credit card according to a second embodiment of the portable memory medium of the present invention.
Figure 4B:
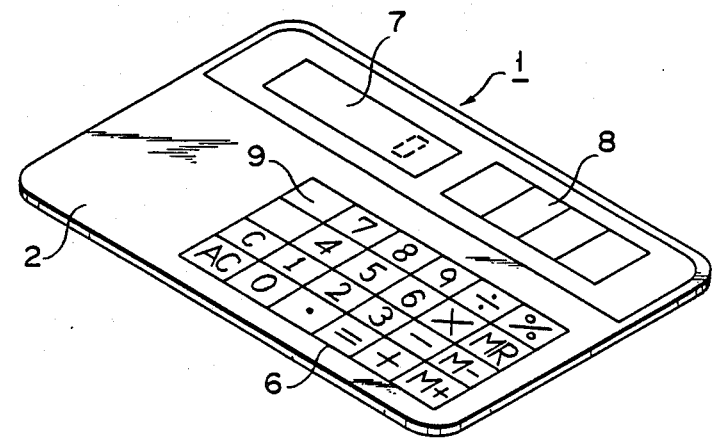

FIGS. 4A and 4B show the outer appearance of credit card 1. As shown in FIG. 4A, embossed information 4 is formed and contactor 5 is provided on the front surface of card main body 2. As shown in FIG. 4B, keyboard 6, liquid crystal display unit 7, and solar cell 8 are provided on the rear surface of main body 2. Keyboard 6 has collation key 9 as well as ten keys and function keys.

FIG. 5 schematically shows the circuit configuration of credit card 1 shown in FIGS. 4A and 4B. Card 1 consists of CPU 11, data and program memories 12 and 13, and display driver 15, and is constituted by 1-chip IC 14.

1-chip IC 14 is buried in card main body 2 and receives operation power from solar cell 8. In the second embodiment, data memory 12 stores the PIN (collation information) of the card owner and a balance for shipping (a predetermined amount of money) as well as the embossed information formed on the surface of main body 2.

The operation of the second embodiment having the above arrangement will be described with reference again to FIG. 6. Assume that a card owner wishes to purchase articles at a shop by using credit card 1 instead of paying in cash, the same as in the first embodiment.

The card owner brings the articles to the register, takes out his card 1, inputs his PIN through keyboard 6, and depresses collation key 9. CPU 11 performs collation to check whether the input PIN coincides with that stored in data memory 12. If the two PINs coincide, CPU 11 sends a message indicating a coincidence on liquid crystal display unit 7, reads out the embossed information from memory 12, and displays the readout embossed information on display unit 7. In this case, CPU 11 alternately displays the message indicating the collation result and the embossed information are displayed. The operator looks at the message displayed on display unit 7 to check that the PINs coincide, and collates the content of the embossed information displayed on display unit 7 with that of the embossed information on card 1.

When a coincidence is confirmed, the card owner inputs the total price for the articles through keyboard 6, and depresses collation key 9. CPU 11 checks whether the input amount of money is smaller than the balance for shopping in data memory 12. If the input amount of money is smaller than the balance, CPU 11 subtracts the total price for the articles from the balance and stores the subtraction result as a new balance for shopping in data memory 12. Subsequently, based on the input PIN and the total price, CPU 11 executes operation processing in accordance with a predetermined encrypting algorithm in order to calculate specific encrypted data (sales approval number) (step 56 of FIG. 6B) and displays the calculated encrypted data on liquid crystal display unit 7 (step 58). Then, the card owner submits credit card 1 on which the encrypted data is displayed to the operator of the register (step 60). The operator writes down the encrypted data displayed on display unti 7 on a memo sheet or the like (step 62), and inserts card 1 in an emboss imprinter (not shown) (step 64), thereby issuing a slip to which the embossed information on card 1 is transferred (step 66). The operator writes the written encrypted data on the issued slip (step 68). The encrypted data written on the slip is used as collation data if a trouble occurs on a later day. The user then receives his goods and credit card (step 70).

In the second embodiment, since the readout embossed information is displayed on credit card 1, collation of the embossed information can be performed on card 1, thereby allowing easy collation.

In the first and second embodiments, data and program memories are constituted by a 1-chip IC. However, they can be constituted by a plurality of IC chips.

The display means is not limited to a liquid crystal display unit but can be another display medium such as a plasma or EL (Electro Luminescence) display. The cell is not limited to the solar cell but can be a lithium cell and so on.

In the above embodiments, a credit card is used as the portable memory medium. However, the present invention is not limted to a card-like memory medium but can be applied to a block- or pencil-like memory medium.

- The circut configuration of the portable memory medium can be modified in various ways in a manner normally done by a person skilled in the art.

What is claimed is:

1. An IC card having predetermined information embossed on its surface, comprising:
a display section;
storage means for storing the predetermined information; and control means for reading out the predetermined information in response to a read instruction, and for displaying the readout predetermined information on said display section.

2. An IC card according to claim 1, wherein said control means comprises a central processing unit.

3. An IC card according to claim 2, wherein said storage means has an area for storing a personal identification number (PIN), and said control means compares a PIN supplied to said IC card by a user and the PIN read out from said storage means and reads out the predetermined information from said storage means and outputs it to said display section in response to the read instruction only when the two PINs coincide.

4. An IC card according to claim 1, wherein said IC card is a credit card.

5. An IC card according to claim 4, wherein the predetermined information includes a code and name of a card owner and a valid date of the card.

6. An IC card according to claim 4, wherein said control means and said storage means are within the credit card.

7. An IC card according to claim 4, wherein said storage means has an area for storing a balance.

8. An IC card according to claim 2, wherein the read instruction is supplied from keys provided on said IC card.

9. An IC card according to claim 7, further comprising a lithium cell for supplying power to said control means, said storage means, and said display means.

10. An IC card according to claim 4, further comprising keys for inputtting a personal identification number (PIN), and a collation key, wherein said control means compares, in response to depression of the collation key, a PIN input from the keys with a PIN stored in said storage means and displays coincidence information on said display section when the two PINs coincide.

11. An IC card according to claim 10, wherein said control means alternately displays the coincidence information and the predetermined information on said display section.

12. An IC card according to claim 6, further comprising keys for inputting a personal identification number (PIN) and a total price for purchased articles, wherein said storage means stores the PIN, and said control means compares the PIN input from the keys with a PIN stored in said storage means, reads out the predetermined information from said storage means and displays it on said display section only when the two PINs coincide, checks whether the total price for purchased articles is smaller than a balance stored in said storage means, substracts the total price from the balance if the total price is smaller than the balance, stores the subtraction result in said storage means, calculates a specific sales approval number based on the input PIN and the total price, in accordance with a predetermined encrypting algorithm, and displays the calculation result on said display means.

13. An IC card according to claim 8, further comprising a keyboard having keys for inputting a personal identification number (PIN), and a collation key, wherein said storage means stores the PIN, and said control means compares the PIN input from the keyboard with a PIN stored in said storage means, displays a message indicating a collation result, reads out the predetermined information from said storage means and displays it on said display section, thereby permitting an operator to compare the display predetermined information with predetermined information embossed on said IC card in order to check the authenticity of the embossed predetermined information.

* * * * *